H. F. FORTMANN.
GRILL.
APPLICATION FILED DEC. 4, 1917.

1,266,244.

Patented May 14, 1918.

WITNESS
F. C. Fliedner
J. C. Benesch

INVENTOR.
Henry F. Fortmann
BY
Strong & Townsend
ATTORNEY

UNITED STATES PATENT OFFICE.

HENRY F. FORTMANN, OF SAN FRANCISCO, CALIFORNIA.

GRILL.

1,266,244.　　　　Specification of Letters Patent.　　Patented May 14, 1918.

Application filed December 4, 1917. Serial No. 205,325.

*To all whom it may concern:*

Be it known that I, HENRY F. FORTMANN, a citizen of the United States, residing at the city and county of San Francisco and State of California, have invented new and useful Improvements in Grills, of which the following is a specification.

This invention relates to a grill.

One of the objects of the present invention is to provide a foldable grill which is simple and substantial in construction, cheap to manufacture, easy to handle, and is particularly adapted for use in connection with open fires to support pots and pans when camping, and the like. Another object of the invention is to provide a grill consisting of a plurality of pivotally connected bars which may be subjected to considerable heat without warping and which, when folded, will lie one on top of the other in parallelism so as to form a compact unit for storage or transportation. Further objects will hereinafter appear.

The invention consists of the parts and the construction and combination of parts as hereinafter more fully described and claimed, having reference to the accompanying drawings, in which—

Figure 1:
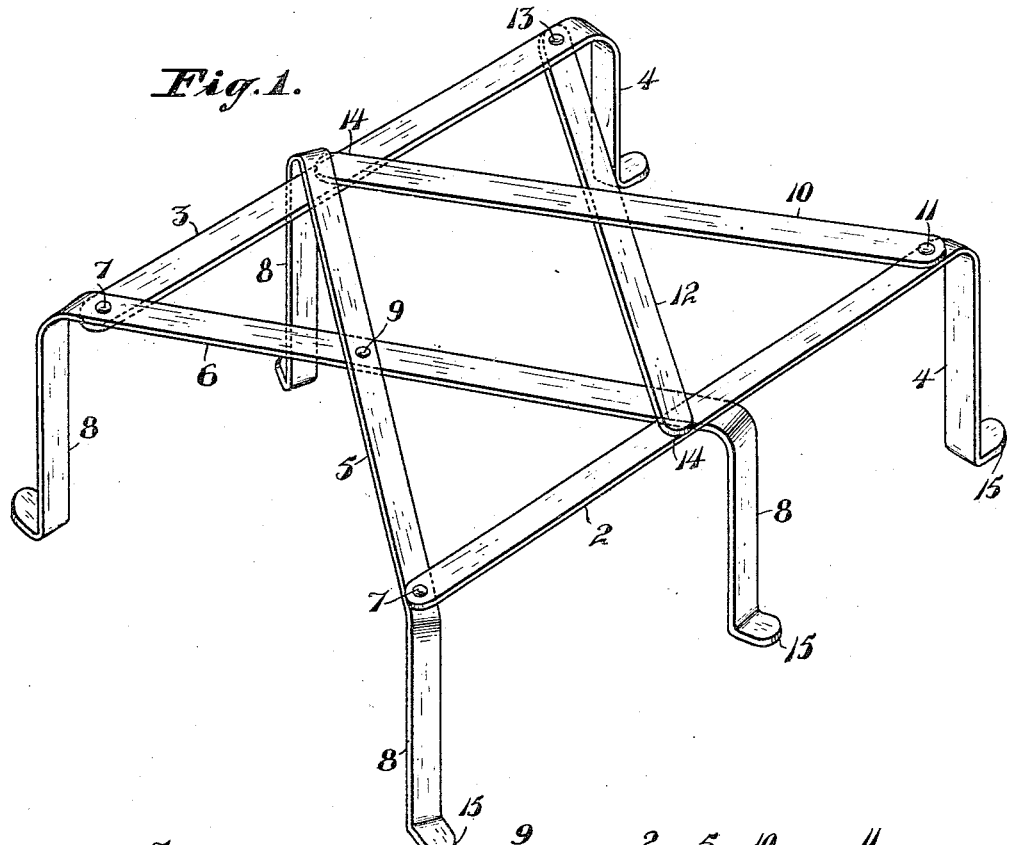
Figure 1 is a perspective view of the grill when unfolded.
Figure 2:
Fig. 2 is an edge view showing the grill folded.

Referring to the drawings, and particularly Fig. 1, it will be seen that the grill consists of a pair of bars 2 and 3 which are adapted to assume an approximately parallel position when the grill is unfolded. Formed on one end of each bar is a foot member 4, and connecting the opposite ends with cross bars 5 and 6 are pivot pins 7. The bars 5 and 6 are provided with foot extensions at each end, as shown at 8, and both bars are pivotally connected at 9 to permit one to fold within the other, as shown in Fig. 2, or to be swung at right angles to cross each other, as shown in Fig. 1, when the grill is unfolded. The bar 2 is provided with a legless bar 10 which is pivotally attached on its upper side, as shown at 11, while the bar 3 is provided with a legless bar 12 which is pivotally attached to the lower side, as shown at 13.

In actual operation, it can be seen that the grill may be readily unfolded to assume the form shown in Fig. 1. This is accomplished by swinging the bar 3 outwardly from the bar 6 as it normally lies within this bar and by swinging the bar 5 at right angles to the bar 6. The legless bars 10 and 12 are then swung about their pivots at right angles to each other, as shown, one crossing the other and both being passed above the bars 2 and 3, respectively, as shown at 14. This is of considerable importance as it form a friction lock which ties the several bars together when unfolded.

The grill as a whole forms a rigid support when unfolded as it is provided with three pairs of legs and as the bars cross each other, as shown, it can readily be seen that they form an ideal support for pots and pans of different sizes and descriptions. This renders the grill particularly handy when cooking over camp fires and the like, and as it may be folded into a compact unit of parallel bars, as shown in Fig. 2, it may be easily carried in a pack, an automobile or by any other means when moving from place to place.

All projecting ends are preferably rounded, as shown at 15, to eliminate sharp corners which might tear or scratch other articles or the carrier in which it is placed when not in use.

While the bars assume a particular formation, such as shown in Fig. 1, when extended, I wish it understood that the grill may assume other shapes if desired; *i. e.*, it may be narrowed or widened, or lengthened, and also that the materials and finish of the several parts herein shown and described may be such as the experience and judgment of the manufacturer may dictate.

Having thus described my invention, what I claim and desire to secure by Letters Patent is—

1. A folding grill comprising a pair of flattened bars crossing each other and pivotally connected, said bars being bent at right angles at their outer ends to form supporting legs, a pair of bars pivotally attached one to each of said first named bars, the opposite end of each last named bar being bent at right angles also to form a supporting leg, and an arm pivotally attached to each of said last named bars, one on top of one bar and one beneath the other bar, said arms and all of said bars adapted to lie one on top of the other when folded in parallelism and to cross each other when extended to form a rigid support.

2. A folding grill comprising a pair of bars pivotally connected at their center portions, one being placed on top of the other, said bars having their outer ends turned at right angles to form supporting legs, said lowermost bar and legs being sufficiently short to permit them to be swung in under the uppermost bar and legs, a bar pivotally connected on top of the topmost bar, said bar having its opposite end bent at right angles to form a supporting leg, said bar and leg being sufficiently long to swing outside of the topmost bar above mentioned, a bar pivotally attached at one end to the lowermost side of the lowermost bar, said bar having its opposite end bent at right angles to form a supporting leg and being sufficiently short to permit it to swing within the lowermost bar above mentioned, and an arm pivotally attached to each of the bars that is provided with one leg.

3. A folding grill comprising a pair of inverted, U-shaped, flattened bars pivotally connected at their center portions, one being placed on top of the other, and the lowermost bar being sufficiently short to nest within the upper bar when they are folded in parallelism, a bar pivotally attached at one end to the topmost U-bar, said bar having its opposite end bent at right angles to form a supporting leg, said bar and leg being sufficiently long to swing outside of the topmost U-bar to lie on top thereof and parallel therewith, and a second bar pivotally attached at one end to the lowermost U-bar, the opposite end of said bar being bent at right angles to form a supporting leg, said bar and leg being sufficiently short to swing within the lowermost U-bar to permit it to nest therein and to lie parallel therewith.

4. A folding grill comprising a pair of inverted, U-shaped, flattened bars pivotally connected at their center portions, one being placed on top of the other, and the lowermost bar being sufficiently short to nest within the upper bar when they are folded in parallelism, a bar pivotally attached at one end to the topmost U-bar, said bar having its opposite end bent at right angles to form a supporting leg, said bar and leg being sufficiently long to swing outside of the topmost U-bar to lie on top thereof and parallel therewith, a second bar pivotally attached at one end to the lowermost U-bar, the opposite end of said bar being bent at right angles to form a supporting leg, said bar and leg being sufficiently short to swing within the lowermost U-bar to permit it to nest therein and to lie parallel therewith, a bar pivotally attached at one end to the innermost one-leg bar and adapted to be swung at right angles thereto or to lie parallel therewith, and a bar pivotally attached to the outermost one-leg bar adapted to be swung at right angles thereto or to lie parallel therewith.

In testimony whereof I have hereunto set my hand in the presence of two subscribing witnesses.

HENRY F. FORTMANN.

Witnesses:
WILLIAM TIMSON,
A. K. TICHENOR.

Copies of this patent may be obtained for five cents each, by addressing the "Commissioner of Patents, Washington, D. C."